(12) United States Patent
Clark et al.

(10) Patent No.: US 7,600,088 B1
(45) Date of Patent: Oct. 6, 2009

(54) TECHNIQUES FOR PROVIDING STORAGE ARRAY SERVICES TO A CLUSTER OF NODES USING PORTAL DEVICES

(75) Inventors: Roy Clark, Hopkinton, MA (US); Robert P. Ng, Millbrae, CA (US)

(73) Assignee: EMC Corporation, Hopkinton, MA (US)

( * ) Notice: Subject to any disclaimer, the term of this patent is extended or adjusted under 35 U.S.C. 154(b) by 515 days.

(21) Appl. No.: 11/474,635

(22) Filed: Jun. 26, 2006

(51) Int. Cl.
*G06F 12/16* (2006.01)
(52) U.S. Cl. .................. 711/162; 711/111; 711/114
(58) Field of Classification Search ............... None
See application file for complete search history.

(56) References Cited

U.S. PATENT DOCUMENTS

| 7,103,647 | B2 | 9/2006 | Aziz |
| 7,373,399 | B2 | 5/2008 | Steele et al. |
| 2003/0172145 | A1 | 9/2003 | Nguyen |
| 2003/0212643 | A1 | 11/2003 | Steele et al. |
| 2003/0212716 | A1 | 11/2003 | Steele et al. |
| 2003/0212898 | A1 | 11/2003 | Steele et al. |
| 2004/0015408 | A1 | 1/2004 | Rauen et al. |
| 2004/0117476 | A1 | 6/2004 | Steele et al. |
| 2004/0221003 | A1 | 11/2004 | Steele et al. |
| 2004/0250030 | A1* | 12/2004 | Ji et al. ................. 711/162 |
| 2007/0112714 | A1 | 5/2007 | Fairweather |
| 2007/0168693 | A1 | 7/2007 | Pittman |
| 2007/0198789 | A1* | 8/2007 | Clark et al. .............. 711/162 |
| 2007/0250674 | A1* | 10/2007 | Fineberg et al. ........... 711/162 |

* cited by examiner

*Primary Examiner*—Jack A Lane
(74) *Attorney, Agent, or Firm*—BainwoodHuang

(57) ABSTRACT

A storage system includes a local storage array and a remote storage array. The local storage array has a host interface configured to communicate with an external host, a local storage device coupled to the host interface, and a portal device coupled to the host interface. The remote storage array has a remote storage device. The portal device of the local storage array includes local circuitry configured to communicate with (i) the external host through the host interface of the local storage array and (ii) the remote storage device of the remote storage array through a communications pathway. The portal device is configured to behave as a local disk to the external host to enable the external host to perform data mirroring operations between the local storage device and the remote storage device through the host interface.

22 Claims, 6 Drawing Sheets

TECHNIQUES FOR PROVIDING STORAGE ARRAY SERVICES TO A CLUSTER OF NODES USING PORTAL DEVICES

BACKGROUND

Cluster volume manager (CVM) software enables nodes of a cluster to simultaneously access and manage a set of disk drives under volume manager control (i.e., a shared pool of storage). The CVM typically presents the same logical view of the disk drives to all of the cluster nodes. In a shared disk CVM having a distributed configuration, each node must coordinate its own access to local disks and remote disks. Accordingly, if a node fails, the other nodes can still access the disks.

FIG. 1 shows a conventional distributed CVM environment 20 having a cluster 22 consisting of two nodes 24(A), 24(B) (collectively, nodes 24), and array-based disk storage 26 consisting of two disk arrays 28(A), 28(B) (collectively, disk arrays 28). A short communications medium 30(A) (e.g., a SCSI cable, a Fibre Channel fabric or iSCSI LAN fabric) provides connectivity between the node 24(A) and the disk array 28(A) in a localized manner. Similarly, a short communications medium 30(B) provides connectivity between the node 24(B) and the disk array 28(B). Additionally, a computer network 32 (e.g., a Metropolitan Area Network) connects the node 24(A) to the disk array 28(B), and further connects the node 24(B) to the disk array 28(A).

As further shown in FIG. 1, each disk array 28 includes a host adapter 34 and an array of disk drives 36. In particular, the disk array 28(A) includes a host adapter 34(A) and an array of disk drives 36(A). Similarly, the disk array 28(B) includes a host adapter 34(B) and an array of disk drives 36(B). The CVM software ensures identical content between the disk drives 36(A) of the disk array 24(A) and the disk drives 36(B) of the disk array 24(B) to form logical disk content appearing as disk mirror pairs 38 which are accessible by the cluster 22 of nodes 24.

During CVM setup, a CVM technician configures the node 24(A) to locally access the disk array 28(A) through the medium 30(A), and to remotely access the disk array 28(B) through a link of the computer network 32. Furthermore, the CVM technician configures the node 24(B) to locally access the disk array 28(B) through the medium 30(B), and to remotely access the disk array 28(A) through another link of the computer network 32. A dashed line 40 delineates the array-based disk storage 26 from the cluster 22 and the computer network 32, which the CVM technician must properly configure prior to CVM operation, i.e., proper administration of the CVM requires proper establishment of the links through the computer network 32.

Once CVM setup is complete, the nodes 24 are capable of performing mirrored writes to the array-based disk storage 26. For example, for the node 24(A) to write data to the array-based disk storage 26, the node 24(A) performs (i) a local write operation 42(L) on the disk array 28(A) through the medium 30(A), and (ii) a remote write operation 42(R) with the disk array 28(B) through the computer network 32 (see the dashed arrows in FIG. 1). For the node 24(B) to write data to the array-based disk storage 26, the node 24(B) performs (i) a local write operation on the disk array 28(B) through the medium 30(B), and (ii) a remote write operation with the disk array 28(A) through the computer network 32 in a similar manner. These contemporaneous local and remote writes by the nodes 24 enable data mirroring across an extended distance (e.g., across a campus or city) thus protecting the data against a single site failure (e.g., a building fire).

An example of CVM software which runs on a cluster of nodes and which performs data storage operations similar to those described above is offered by Veritas Software which has merged with Symantec Corporation of Cupertino, Calif. Another example of such CVM software is offered by Oracle Corporation of Redwood Shores, Calif.

SUMMARY

Unfortunately, there are deficiencies to the above-described conventional CVM environment 20 of FIG. 1. Because each disk 36 must be configured for shared access by each node 24 of the cluster 22, the nodes 24, the storage arrays 28 and the computer network 32 must be configured to enable accesses to and from both local and remote devices. Accordingly, it is burdensome on the CVM technician to properly configure and support both the local and remote aspects of the CVM nodes 24 and the computer network 32. Furthermore, there is limited opportunity to perform write data optimizations to limit bandwidth consumption across the computer network 32.

In contrast to the above-described conventional CVM environment 20 which imposes a significant burden on the CVM technician to setup and maintain links within the computer network 32, improved techniques involve utilization of portal devices which are capable of behaving as local disks to external hosts. The use of such portal devices enables the external hosts to perform localized data mirroring operations on closely located storage devices and portal devices yet still obtain protection against single site failures through forwarding of write operations from the portal devices to remote storage. Such mechanisms are well-suited for CVM environments and can simplify CVM administration.

One embodiment is directed to a storage system which includes a local storage array and a remote storage array. The local storage array has a host interface configured to communicate with an external host, a local storage device coupled to the host interface, and a portal device coupled to the host interface. The remote storage array has a remote storage device. The portal device of the local storage array includes local circuitry configured to communicate with (i) the external host through the host interface of the local storage array and (ii) the remote storage device of the remote storage array through a communications pathway. The portal device is configured to behave as a local disk to the external host to enable the external host to perform data mirroring operations between the local storage device and the remote storage device through portal device.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Improved techniques involve utilization of portal devices which are capable of behaving as local disks to external hosts. The use of such portal devices enables the external hosts to perform data mirroring operations on localized storage devices in combination with localized portal devices yet still obtain protection against single site failures through forwarding of write operations from the localized portal devices to remote storage. Such mechanisms are well-suited for CVM environments and can simplify CVM administration.

Figure 1:
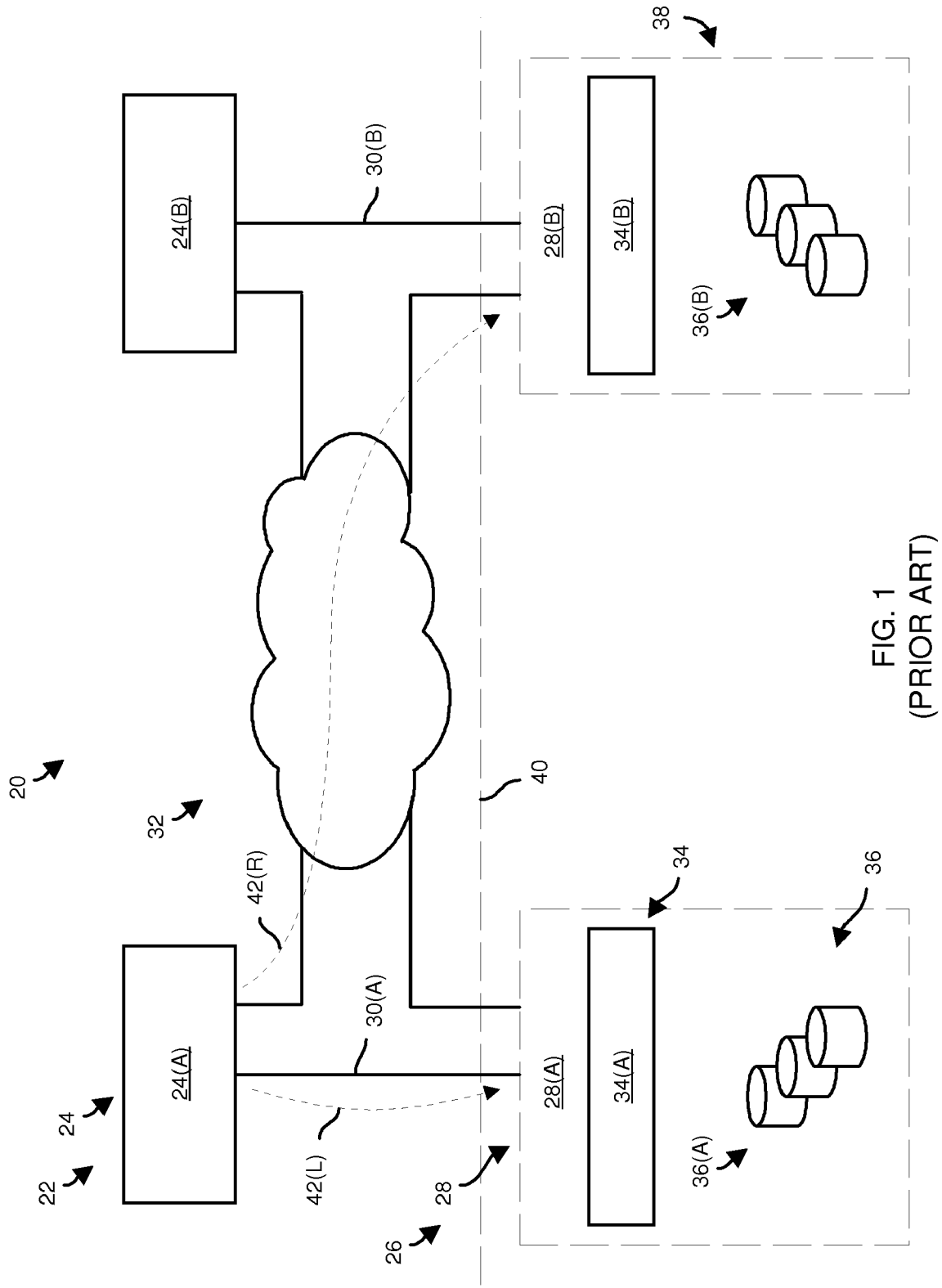
FIG. 1 is a block diagram of a conventional data storage environment having a cluster of nodes and array-based disk storage.
Figure 2:
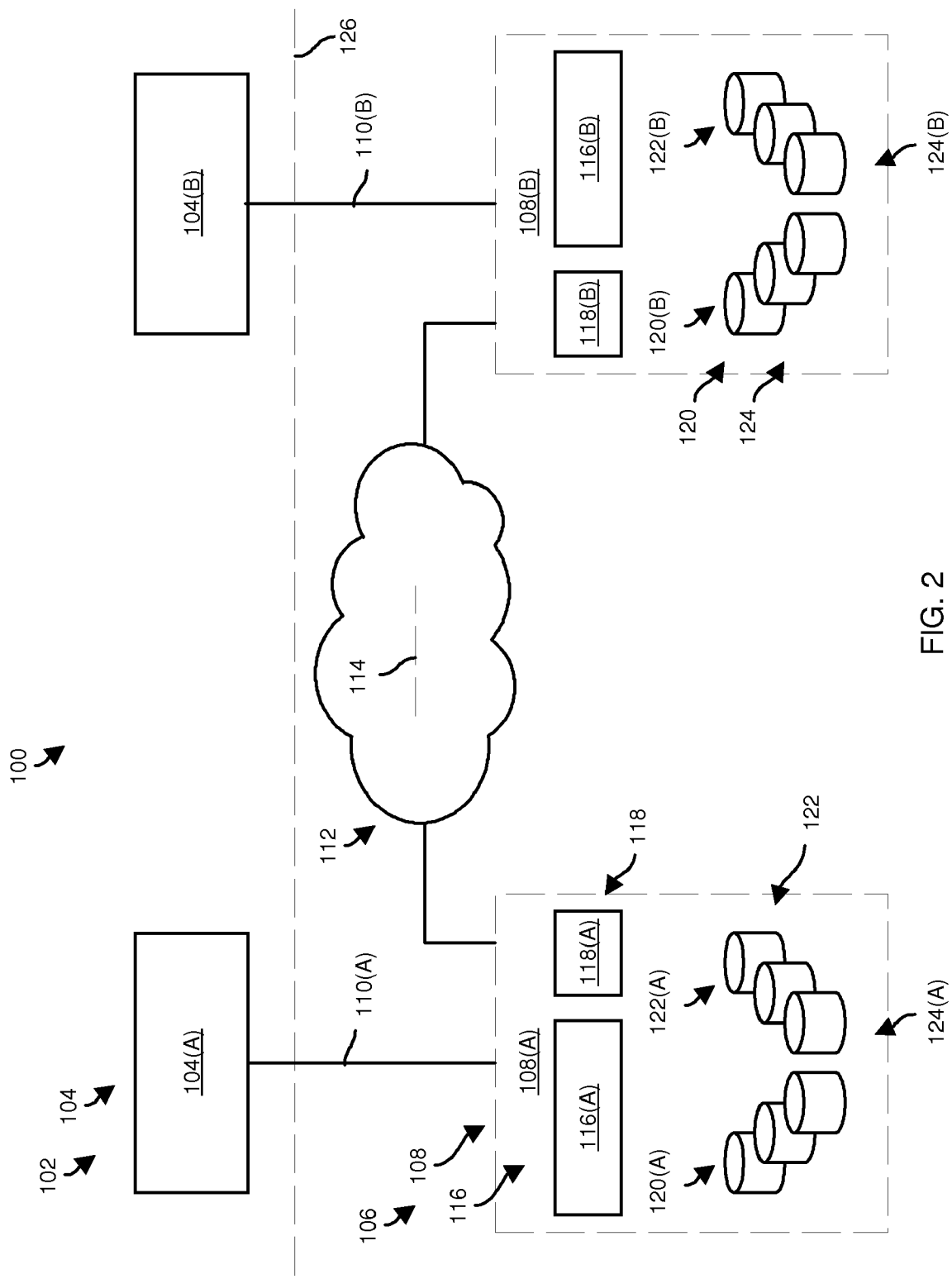
FIG. 2 is a block diagram of an improved data storage environment having a cluster of nodes and array-based storage resources equipped with portal devices.

FIG. 2 shows a geographically dispersed data storage environment 100 which includes a cluster 102 of external hosts 104(A), 104(B) (collectively, external hosts 104) and array-based storage 106 having multiple storage arrays 108(A), 108(B) (collectively, storage arrays 108). A short communications medium 110(A) (e.g., a SCSI cable, a Fibre Channel fabric or iSCSI LAN fabric, etc.) provides connectivity between the external host 104(A) and the storage array 108(A) in a localized manner. Similarly, a short communications medium 110(B) provides connectivity between the external host 104(B) and the storage array 108(B). Additionally, a network 112 (e.g., the Internet, wireless communications, dedicated fiber, a Wide Area Network, a Metropolitan Area Network, other computerized network topologies, combinations thereof, etc.) connects the storage arrays 108 together. In some arrangements, the network 112 provides a set of simultaneous, bi-directional communications pathways 114 to support one or more high-speed communications protocols such as iSCSI, Fibre Channel over IP (FCIP), and the like.

As further shown in FIG. 2, the storage arrays 108 include host interfaces 116, network interfaces 118, storage devices 120 and portal devices 122. In particular, the storage array 108(A) includes a host interface 116(A), a network interface 118(A), an array of storage devices 120(A) (e.g., disk drives), and an array of portal devices 122(A) (e.g., local circuitry configured to operate as one or more portal device 122). Similarly, the storage array 108(B) includes a host interface 116(B), a network interface 118(B), an array of storage devices 120(B), and an array of portal devices 122(B). In the CVM context, the storage devices 120(A) and the portal devices 122(A) of the storage array 108(A) are paired up by the CVM software to form local device mirror pairs 124(A) which are accessible by the external host 104(A). Likewise, the storage devices 120(B) and the portal devices 122(B) of the storage array 108(B) are paired up by the CVM software to form local device mirror pairs 124(B) which are accessible by the external host 104(B). Preferably, the portal devices 122(A) and the storage devices 120(A) reside in different local fault domains for enhanced fault tolerance.

It should be understood that the array-based storage 106 may be setup so that the storage arrays 108 are configured to communicate with each other through the network 112 prior to involvement by a cluster administrator (e.g., a CVM technician). For example, the network interfaces 118 and the communications pathways 114 through the network 112 can be configured at the time of setting up the array-based storage 106. In this situation, the setup burden on the cluster administrator is to simply configure the external hosts 104 to communicate locally with the storage arrays 108 (as illustrated by what is shown above the dashed line 126 in FIG. 2). That is, the cluster administrator simply configures the external host 104(A) to locally communicate with the storage array 108(A) through the communications medium 110(A). Similarly, the cluster administrator configures the external host 104(B) to locally communicate with the storage array 108(B) through the communications medium 110(B).

Once the external hosts 104 are configured to communicate with their respective local storage arrays 108 by the cluster administrator, the portal devices 122 behave as local devices (e.g., local disks) to the external hosts 104 and thus enable the external hosts 104 to reliably and robustly perform local data access operations. In particular, to perform a mirrored write operation, an external host 104 simply performs two local write operations, one write operation with a local storage device 120 and another write operation on a corresponding local portal device 122 (i.e., a local disk mirror pair) of the local storage array 108.

As will now be explained with reference to FIG. 3, the portal device 122 at each storage array 108 has an association with an actual storage device 120 of the other storage array 108. Through this association, the portal device 122 transparently carries out remote write operations to the actual storage device 120 on the other storage array 108 thus providing true remote mirroring for protection against a single site failure.

Figure 3:
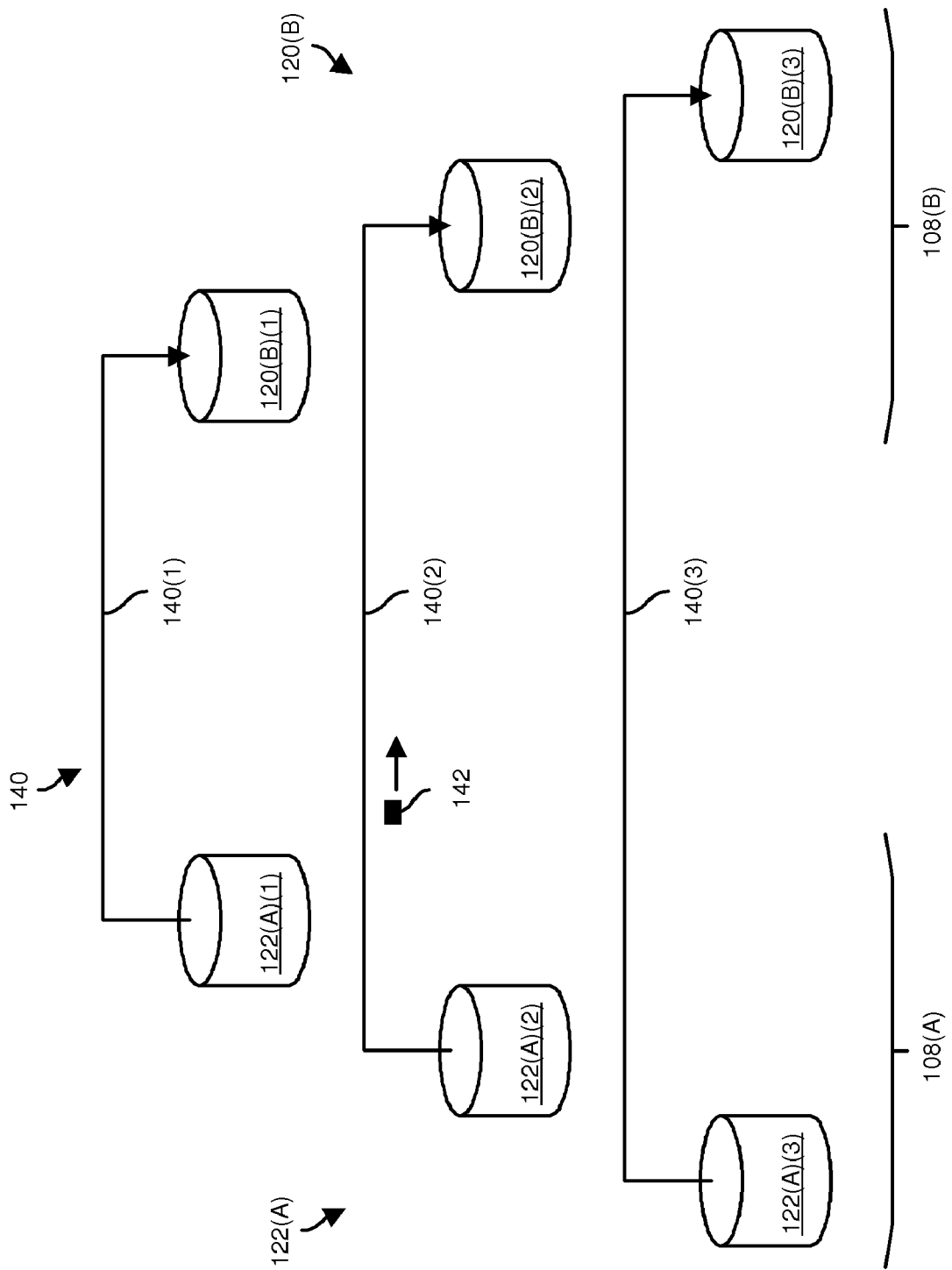
FIG. 3 is a diagram showing associations between some of the portal devices and actual storage devices of FIG. 2.

FIG. 3 is a diagram showing exemplary associations 140 between some of the portal devices 122(A) of the storage array 108(A) and corresponding storage devices 120(B) of storage array 108(B). It should be understood that similar associations 140 exist in the reverse direction between the portal devices 122(B) of the storage array 108(B) and the storage devices 120(A) of the storage array 108(A) as well.

As shown by the arrow 140(1), the portal device 122(A)(1) of the storage array 108(A) corresponds to the storage device 120(B)(1) (e.g., a real disk drive) of the storage array 108(B). Additionally, the portal device 122(A)(2) corresponds to the storage device 120(B)(1) as shown by the arrow 140(2), the portal device 122(A)(3) corresponds to the storage device 120(B)(3) as shown by the arrow (3), and so on.

Each association 140 between a portal device 122 and a storage device 120 illustrates a forwarding operation which is performed by that portal device 122. For example, the portal device 122(A)(2) can receive a write request (i.e., a block-based write command with data) from the local external host 104(A) through the host interface 116(A) and then forward that write request (see the block 142 in FIG. 3) to the corresponding remote storage device 120(B)(2) through the network interface 118 and the network 112 (also see FIG. 2). The remote storage device 120(B)(2) can then process the write operation. During this process, the external host 104(A) views the portal device 122(A)(2) as a regular local storage device 120 (e.g., a local disk) even though the portal device 122(A)(2) transparently carries out the write operation with the remote storage device 120(B)(2).

Likewise, the portal device 122(A)(2) can receive a read request (i.e., a block-based read command requesting data) from the local external host 104(A) through the host interface 116(A) and then forward that read request (see the block 142 in FIG. 3) to the corresponding remote storage device 120(B)(2) through the network interface 118 and the network 112 (also see FIG. 2). The remote storage device 120(B)(2) can then process the read operation and return the requested data. During this process, the external host 104(A) views the portal device 122(A)(2) as a regular local storage device 120 (e.g., a local disk) even though the portal device 122(A)(2) transparently carries out the read operation from the remote storage device 120(B)(2).

Based on the above, the storage devices 120(B) do not need to be made remotely accessible directly to the external host 104(A) as is required in a conventional CVM environment. Accordingly, many of the deficiencies in constructing a conventional shared cluster where CVM nodes and physical disk resources are separated by a substantial distance (e.g., at least two miles) are alleviated. Further details will now be provided with reference to FIG. 4.

Figure 4:
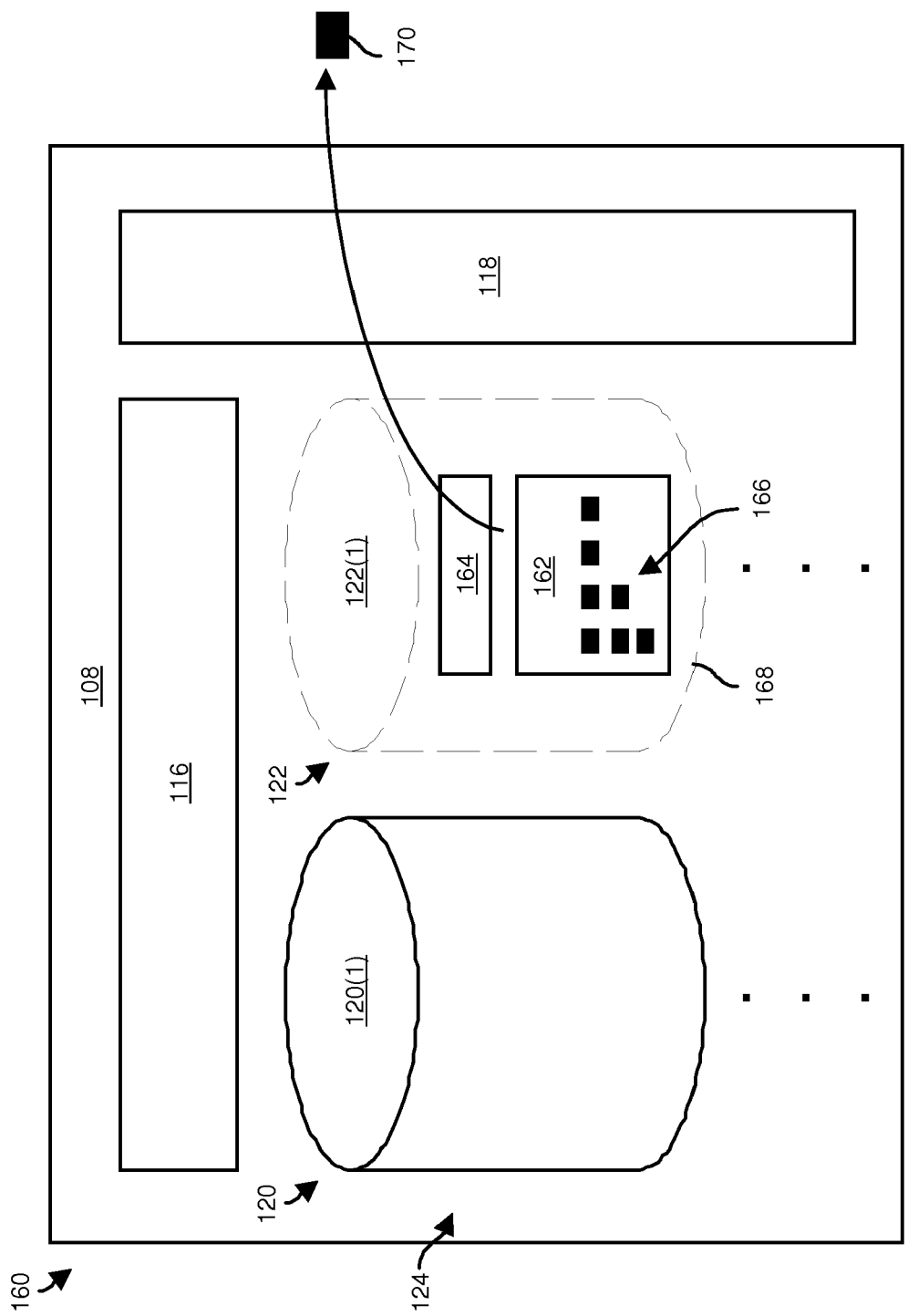
FIG. 4 is a block diagram of a storage array of the data storage environment of FIG. 2.

FIG. 4 is a detailed block diagram 160 of a storage array 108 of the array-based resources 106 (also see the storage arrays 108(A), 108(B) in FIG. 2). Although only one storage device 120(1) is shown, it should be understood that each storage array 108 is capable of including multiple storage devices 120. Similarly, although only one portal device 122(1) is shown, it should be understood that each storage array 108 is capable of including multiple portal devices 122 or local circuitry which is configured to operate as multiple portal devices 122. By means of the mirror function in the CVM software, the storage device 120(1) and the portal device 122(1) form a mirror pair 124 which is locally accessible by an external host 104 so that, when the external host 104 writes data to the local storage device 120(1), the external host 104 further targets the portal device 122(1) with a similar write operation.

As shown in FIG. 4, the portal device 122(1) includes a buffer 162 and a controller 164. The buffer 162 is configured to temporarily store write operations (or requests) 166 received from a local external host 104 through the host interface 116. The controller 164 is configured to forward the write operations 166 from the buffer 162 to a remote storage device 120 of another storage array 108 through the network interface 118 and a communications pathway 114 of the network 112 (e.g., a high-speed link).

The portal device 122(1) is shown with an outline 168 of a disk drive to illustrate that it is serving the role of a proxy for the remote storage devices 120. The local storage device 120(1) and the portal device 122(1) are configured to appear as a single pair of local disk drives to the external host 104 through the host interface 116. Nevertheless, the data on the local storage device 120 and mirrored on the remote storage device 120 represented by the local portal device 122 can be separated by an extended distance such as by at least two miles for competent remote site disaster recovery purposes.

In some arrangements, the controller 164 is configured to bundle multiple write operations 166 together to form a single composite message 170 and then forward that single composite message 170 to the other storage array 108 through the network interface 118 and the communications pathway 114 of the network 112 (also see FIG. 2) in lieu of sending the write operations 166 to the other storage array 108 individually. These arrangements enable amortization of the framing and message processing overhead involved in conveying the write operations 166 from the local storage array 108 to the remote storage array 108 through the network 112.

Additionally, in some arrangements, the controller 164 is configured to compress the data within the write operations 166 from a first size to a second size which is smaller than the first size to reduce size of the write operations 170 being sent through the network interface 118 and the communications pathway 114 of the network 112. These arrangements reduce the bandwidth consumed through the network 112 (which is desirable in heavy traffic network situations) and a variety of well-known compression techniques are suitable for use. Further details will now be provided with reference to FIG. 5.

Figure 5:
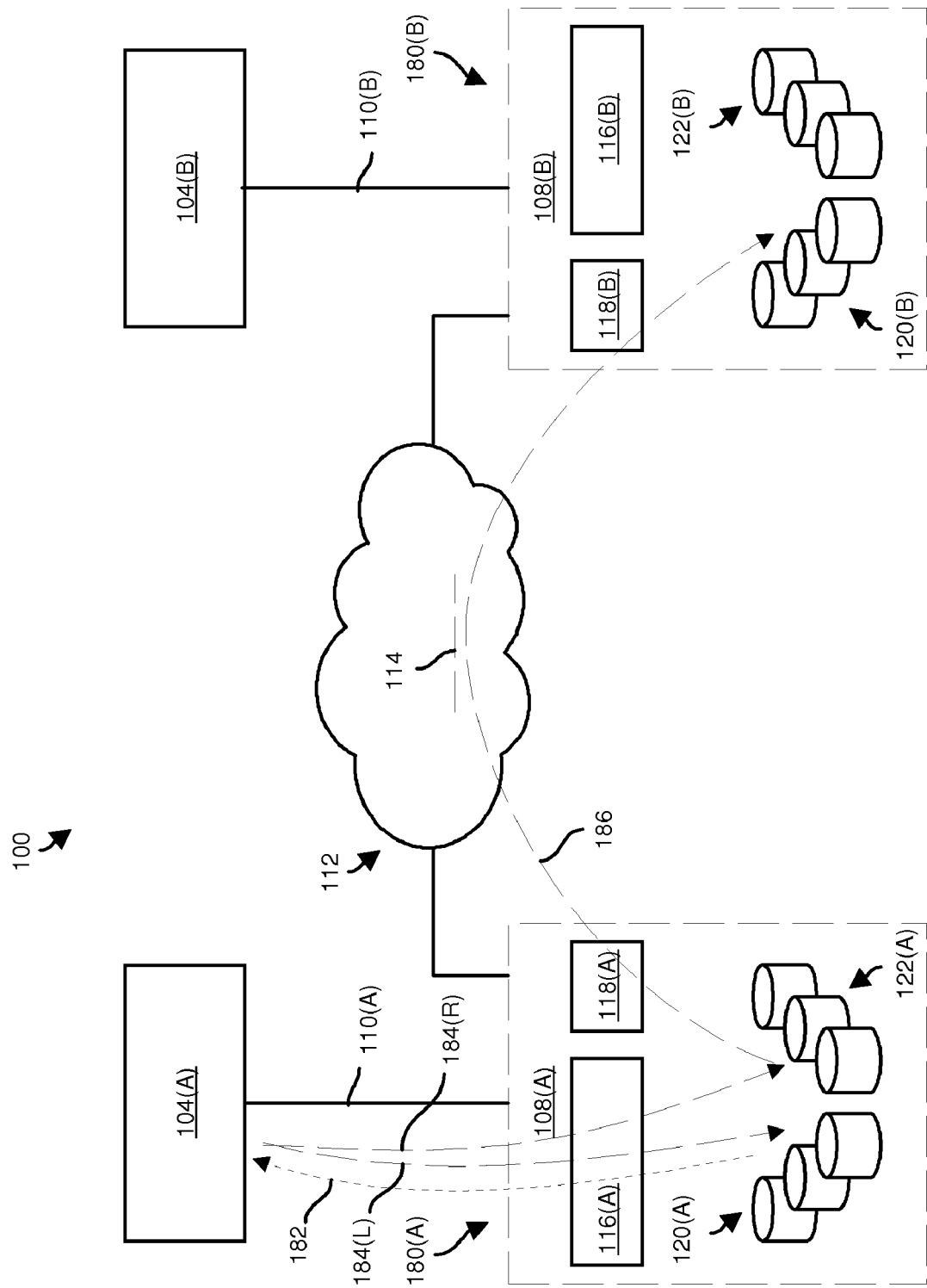
FIG. 5 is a block diagram outlining activity for read and write operations for a storage array of the data storage environment of FIG. 2.

FIG. 5 is a block diagram which illustrates activity for supported storage array services (e.g., read and write operations by an external host 104) of the data storage environment 100. Suppose that the storage devices 120(A), 120(B) of the storage arrays 108(A), 108(B) form an Oracle 10g automatic storage management (ASM) disk group. In particular, suppose that a first ASM fault group 180(A) resides in the storage array 108(A) having storage devices 120(A), and a second ASM fault group 180(B) resides in the storage array 108(B) having storage devices 120(B). Further suppose that data is mirrored by the ASM software running on the external host across the ASM fault groups 180(A), 180(B) so that the storage devices 120(A) on the storage array 108(A) store one copy of the data and the storage devices 120(B) on the other storage array 108(B) store another copy of the data.

In connection with read operations by the external host 104(A), the external host 104(A) reads data 182 (illustrated by the arrow 182) from the local storage devices 120(A) through the host interface 116(A). Such read operations by the external host 104(A) are from the ASM fault group 180(A) which is local to the external host 104(A).

In connection with write operations by the external host 104(A), the external host 104(A) provides writes to both the local storage devices 120(A) (illustrated by the arrow 184(L)) and the local portal devices 122(A) (illustrated by the arrow 184(R)). In response, the local portal devices 122(A) forward the writes they receive to their associated remote storage devices 120(B) on the storage array 108(B) through the communications pathway 114 of the network 112 (illustrated by the arrow 186). Such write forwarding is transparent to the external host 104(A) and thus alleviates the need for the external host 104(A) to have a direct exchange with the storage array 108(B). Nevertheless, such write operations by the external host 104(A) extend across two ASM fault groups, i.e., the local ASM fault group 180(A) and the remote ASM fault group 180(B), for robust fault tolerance.

It should be understood that read and write operations performed by the external host 104(B) occur in a manner which is similar to that described above, but in the opposite direction, i.e., with the external host 104(B) locally communicating with the storage array 108(B) and with the portal devices 122(B) which are local to the external host 104(B) forwarding writes received from the storage array 104(B) to the storage devices 120(A) of the storage array 108(A).

It should be further understood that these portal devices 122 are further capable of satisfying reads if the corresponding local storage device 120(A) becomes unavailable. Accordingly, the portal devices 122 are essentially operative remote disk portals (RDPs) which are configured and equipped to redirect locally provided writes and reads to remote disks. As a result, each RDP provides simultaneous and bi-directional local and remote read/write capability to a disk thus making it appear as a single shared device to an external host 104 (e.g., a CVM node).

Finally, it should be understood that this description is representative of other CVM products besides Oracle's 10g with a similar conventional approach towards host-based remote disk mirroring. Further details will now be provided with reference to FIG. 6.

Figure 6:
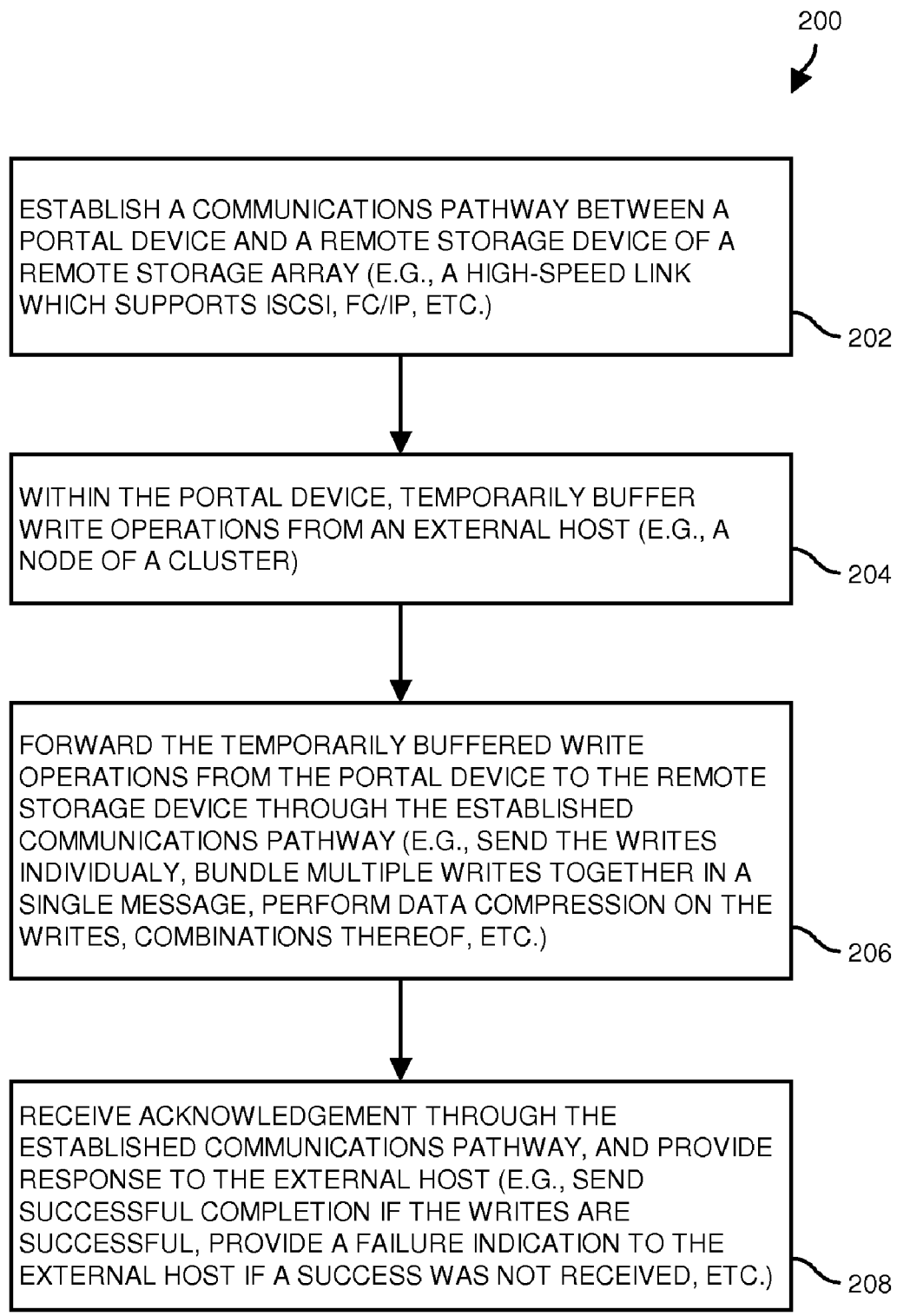
FIG. 6 is a flowchart of a procedure which is performed by the storage array of FIG. 4.

FIG. 6 is a flowchart of a procedure 200 which is performed by each storage array 108. The following explanation of the procedure 200 is provided in the context of the storage array 108(A) although it should be understood that the procedure 200 applies to all storage arrays 108 which are equipped with portal devices 122.

In step 202, the storage array 108(A) establishes a communications pathway 114 between the portal devices 122(A) and the remote storage devices 120(B) of the remote storage array 108(B). In some arrangements, the established communications pathway 114 is a high-speed link of the external network 112.

In step 204, a portal device 122(A) of the storage array 108 temporarily buffers a set of write operations 166 (also see FIG. 4) from the external host 104(A). Such temporary buffering preferably occurs contemporaneously with a corresponding set of traditional write operations performed by a local storage device 120(A) which operates as the second half of a local mirrored pair 124 to the external host 104(A).

In step 206, the portal device 122(A) of the storage array 108 forwards the set of temporarily buffered write operations 166 from the portal device 122(A) to a remote storage device 120(B) of the remote storage array 108(B) through the established communications pathway 114. In some arrangements, the portal device 122(A) frames multiple buffered write operations into a single composite message 170 to reduce overhead. In some arrangements, each write operation undergoes compression to reduce its size. As a result of such operation, there is no need for the external host 104(A) to communicate directly with the remote storage device 120(B). Rather, the external host 104(A) has the luxury of communicating locally with the portal device 122(A).

In step 208, the portal device 122(A) receives acknowledgement through the established communications pathway 114, and provides response (e.g., disk-like behavioral acknowledgements) to the external host 104(A). In particular, if the writes are successful on the remote storage device 120(B), the portal device 122(A) sends a successful completion to the external host 104(A). In the event a success was not received from the remote storage array 108(B), the portal device 122(A) provides a failure indication to the external host 104(A).

Based on the above-provided description, it should be understood that, to a CVM, a targeted portal device 122 logically presents itself just as if it is another local disk pairing up with a real local disk (e.g., a local storage device 120) that the CVM is managing with host-side mirroring data writes. That is, the portal device 122 at site "one" (e.g., the storage array 108(A)) is a logical portal reflecting a real physical disk at site "two" (e.g., the storage array 108(B)), and vice versa.

Furthermore, it should be understood that each portal device 122 is supported by its own mirroring path from the site employing the logical portal to the site where the real physical disk resides. Accordingly, in the event that one of the communications pathways 114 of the network 112 is down, the portal device 122, and its associated real physical disk at the remote site, is capable of being detected and flagged by the CVM as a down disk device. The CVM is then capable of transparently failing over per the CVM mirroring design and provision to running on the remaining CVM disk until the "CVM mirror" is restored. As a result, none of the CVM nodes needs to be shut down.

As described above, improved techniques involve utilization of portal devices 122 which are capable of behaving as local disks to external hosts 104. The use of such portal devices 122 enables the external hosts 104 to perform data mirroring operations on localized storage devices 120 in combination with localized portal devices 122 yet still obtain protection against single site failures through forwarding of write operations from the localized portal devices 122 to remote storage. Such mechanisms are well-suited for CVM environments (e.g., where the external hosts 104 form nodes of a CVM cluster) and can simplify CVM administration.

While this invention has been particularly shown and described with references to preferred embodiments thereof, it will be understood by those skilled in the art that various changes in form and details may be made therein without departing from the spirit and scope of the invention as defined by the appended claims.

For example, the data storage environment 100 was described above as including two external hosts 104 operating as nodes of a cluster for illustration purposes only. It should be understood that such a cluster is capable of including more than two nodes (e.g., three, four, etc.).

Similarly, the array-based storage 106 was described above as including two storage arrays 108 for illustration purposes only. In other arrangements, the array-based storage 106 includes more than two storage arrays 108 (e.g., three, four, etc.) which communicate with each other through communications pathways 114 of the network 112. Such arrangements provide opportunities to employ other fault tolerant schemes (e.g., N-way mirroring, other parity/RAID configurations, etc.). Such modifications and enhancements are intended to belong to various embodiments of the invention.

What is claimed is:

1. A storage system, comprising:
   a local storage array having a host interface configured to communicate with an external host, a local storage device coupled to the host interface, and a portal device coupled to the host interface; and
   a remote storage array having a remote storage device;
   the portal device of the local storage array including local circuitry configured to communicate with (i) the external host through the host interface of the local storage array and (ii) the remote storage device of the remote storage array through a communications pathway, the portal device being configured to behave as a local disk to the external host to enable the external host to perform data mirroring operations on the local storage device and the portal device through the host interface.

2. A storage system as in claim 1 wherein the local circuitry of the portal device is configured to (i) receive a write operation from the external host through the host interface and (ii) forward the write operation to the remote storage device through the communications pathway.

3. A storage system as in claim 2 wherein the local circuitry of the portal device includes:
   a buffer configured to temporarily store write operations received from the external host; and
   a controller coupled to the buffer, the controller being configured to forward the write operations from the buffer to the remote storage device through the communications pathway.

4. A storage system as in claim 3 wherein the controller, when forwarding the write operations from the buffer to the remote storage device, is configured to:
   bundle multiple write operations from the buffer into a single composite message, and send the single composite message to the remote storage device through the communications pathway, in place of individually sending the multiple write operations through the communications pathway.

5. A storage system as in claim 3 wherein the controller, when forwarding the write operations from the buffer to the remote storage device, is configured to:
   compress data within the write operations from a first size to a second size which is smaller than the first size to reduce size of the write operations sent from the buffer to the remote storage device through the communications pathway.

6. A storage system as in claim 3 wherein the controller is configured to communicate with the remote storage device through a high-speed link of an external network as the communications pathway between the portal device and the remote storage device.

7. A storage system as in claim 6 wherein the portal device of the local storage array is configured to be separated from the remote storage device of the remote storage array by at least two miles to protect against a single site failure.

8. A storage system as in claim 3 wherein the local storage device and the portal device are configured to appear as a single set of local disk drives to the external host through the host interface.

9. A storage system as in claim 8 wherein the portal device is configured to receive acknowledgement from the remote storage device through the communications pathway and provide disk-like behavioral response back to the external host in response to the write operations.

10. A storage system as in claim 3 wherein the external host is a node of a cluster of nodes, the node being configured to operate as a cluster volume manager (CVM); and wherein the local storage device and the portal device are configured to form a disk mirror pair which is accessible to the CVM through the host interface.

11. A storage system as in claim 1, further comprising:
a set of hosts, a particular host being constructed and arranged to provide (i) a local write instruction to the local storage device through the host interface and (ii) a remote write instruction to the portal device through the host interface;
wherein the local write instruction is constructed and arranged to write a first copy of particular data to the local storage device, and the remote write instruction is constructed and arranged to write a second copy of the particular data to the portal device;
wherein the external host separately and independently provides the local write instruction to the local storage device through the host interface and the remote write instruction to the portal device through the host interface in a substantially simultaneous manner; and
wherein the local storage device and the portal device form a mirror pair for the particular data once the local storage device stores the first copy of the particular data in response to the local write instruction and the portal device stores the second copy of the particular data in response to the remote write instruction.

12. A storage system as in claim 11 wherein the set of hosts is a cluster, each host forming a node of the cluster;
wherein the set of hosts runs a cluster volume manager (CVM) software application; and
wherein the particular host is constructed and arranged to provide the local write instruction to the local storage device through the host interface and the remote write instruction to the portal device through the host interface in response to execution of a mirror function by at least a portion of the CVM software application while the CVM software application runs on the set of hosts.

13. A storage array, comprising:
a host interface configured to communicate with an external host;
a local storage device coupled to the host interface; and
a portal device coupled to the host interface, the portal device including local circuitry configured to communicate with (i) the external host though the host interface and (ii) a remote storage device through an external communications pathway, the portal device being configured to behave as a local disk to the external host to enable the external host to perform data mirroring operations on the local storage device and the portal device through the host interface.

14. A storage array as in claim 13 wherein the local circuitry of the portal device is configured to (i) receive a write operation from the external host through the host interface and (ii) forward the write operation to the remote storage device through the communications pathway.

15. A storage array as in claim 14 wherein the local circuitry of the portal device includes:
a buffer configured to temporarily store write operations received from the external host; and
a controller coupled to the buffer, the controller being configured to forward the write operations from the buffer to the remote storage device through the communications pathway.

16. A storage array as in claim 15 wherein the controller, when forwarding the write operations from the buffer to the remote storage device, is configured to:
bundle multiple write operations from the buffer into a single composite message, and send the single composite message to the remote storage device through the communications pathway, in place of individually sending the multiple write operations through the communications pathway.

17. A storage array as in claim 15 wherein the controller, when forwarding the write operations from the buffer to the remote storage device, is configured to:
compress data within the write operations from a first size to a second size which is smaller than the first size to reduce size of the write operations sent from the buffer to the remote storage device through the communications pathway.

18. A storage array as in claim 15 wherein the controller is configured to communicate with the remote storage device through a high-speed link of an external network as the communications pathway between the portal device and the remote storage device.

19. A storage array as in claim 18 wherein the portal device is configured to be separated from the remote storage device by at least two miles to protect against a single site failure.

20. A storage array as in claim 15 wherein the local storage device and the portal device are configured to appear as a single set of local disk drives to the external host through the host interface.

21. A storage array as in claim 20 wherein the portal device is configured to receive acknowledgement from the remote storage device through the communications pathway and provide disk-like behavioral response back to the external host in response to the write operations.

22. In a local storage array having a host interface, a local storage device and a portal device, a method for providing storage array services to an external host participating as a node of a cluster of nodes, the external host being configured to operate as a cluster volume manager (CVM), the method comprising:
establishing a communications pathway from the portal device to a remote storage device of a remote storage array;
within the portal device, temporarily buffering write operations from the external host, the portal device being configured to behave as a local disk to the external host to enable the CVM to perform data mirroring operations by providing a local write instruction to the local storage device through the host interface and remote write instruction to the portal device through the host interface, the local write instruction and the remote write instruction (i) being separate and independent, (ii) including the same data and (iii) being provided through the host interface in a substantially contemporaneous manner; and forwarding the temporarily buffered write operations from the portal device to the remote storage device through the established communications pathway.

* * * * *